United States Patent
Nordmark et al.

(10) Patent No.: US 12,086,820 B2
(45) Date of Patent: Sep. 10, 2024

(54) TECHNOLOGY OPPORTUNITY MAPPING

(71) Applicant: ITERATE STUDIO INC., Highlands Ranch, CO (US)

(72) Inventors: Jon C. Nordmark, Littleton, CO (US); Brainerd Sathianathan, Morgan Hill, CA (US); Frederick Michael Frazzini, Aurora, CO (US); Niharika Shukla, Highlands Ranch, CO (US)

(73) Assignee: ITERATE STUDIO INC., Littleton, CO (US)

( * ) Notice: Subject to any disclaimer, the term of this patent is extended or adjusted under 35 U.S.C. 154(b) by 321 days.

(21) Appl. No.: 17/031,623

(22) Filed: Sep. 24, 2020

(65) Prior Publication Data
US 2021/0090105 A1    Mar. 25, 2021

Related U.S. Application Data

(60) Provisional application No. 62/905,013, filed on Sep. 24, 2019.

(51) Int. Cl.
*G06Q 30/0204* (2023.01)
*G06F 9/451* (2018.01)
*G06F 16/28* (2019.01)
*G06N 3/04* (2023.01)
*G06N 20/00* (2019.01)
(Continued)

(52) U.S. Cl.
CPC ......... *G06Q 30/0204* (2013.01); *G06F 9/451* (2018.02); *G06F 16/285* (2019.01); *G06N 3/04* (2013.01); *G06N 20/00* (2019.01); *G06Q 10/0639* (2013.01); *G06F 40/205* (2020.01)

(58) Field of Classification Search
CPC ........... G06Q 30/0204; G06Q 10/0639; G06F 9/451; G06F 16/285; G06F 40/205; G06N 20/00; G06N 3/04
See application file for complete search history.

(56) References Cited

U.S. PATENT DOCUMENTS

2006/0015380 A1* 1/2006 Flinn ................. G06Q 10/0637
705/7.33
2008/0288309 A1* 11/2008 Nasukawa ......... G06Q 30/0202
707/E17.014
(Continued)

OTHER PUBLICATIONS

Market Map, Part Two: 170+ Technology Companies Reshaping Commercial Real Estate; Wedlake; Aug. 2018 (Year: 2018).*
(Continued)

*Primary Examiner* — Deirdre D Hatcher
(74) *Attorney, Agent, or Firm* — Dorsey & Whitney LLP

(57) ABSTRACT

The present disclosure provides for a system for evaluating technology offerings of one or more companies. A database includes a plurality of available technologies associated with one or more tags categorizing the available technology. A user interface receives user input specifying one or more technology parameters. A correlation engine returns one or more available technologies from the database based on a correlation between the one or more received technology parameters and the one or more tags associated with the one or more available technologies. A landscape engine groups the one or more available technologies based on tags and generates an interactive technology opportunity map for display on the user interface.

20 Claims, 6 Drawing Sheets

(51) Int. Cl.
*G06Q 10/0639* (2023.01)
*G06F 40/205* (2020.01)

(56) References Cited

U.S. PATENT DOCUMENTS

| | | | | |
|---|---|---|---|---|
| 2012/0278244 | A1* | 11/2012 | Lee | G06Q 50/184 |
| | | | | 705/310 |
| 2013/0060611 | A1* | 3/2013 | Fenstermaker | G06Q 10/06 |
| | | | | 705/7.39 |
| 2014/0279584 | A1* | 9/2014 | Lee | G06F 3/0481 |
| | | | | 705/310 |
| 2016/0085844 | A1* | 3/2016 | Okamoto | G06F 16/3338 |
| | | | | 707/722 |
| 2020/0410617 | A1 | 12/2020 | Wichern et al. | |
| 2021/0081965 | A1 | 3/2021 | Selvadurai | |

OTHER PUBLICATIONS

Technology Landscape Mapping; Spitsberg et al.; Aug. 2013 (Year: 2013).*

* cited by examiner

TECHNOLOGY OPPORTUNITY MAPPING

CROSS REFERENCE TO RELATED APPLICATIONS

This Application claims priority under 35 U.S.C. § 119 to U.S. provisional patent application No. 62/905,013 entitled "Technology Opportunity Mapping," filed on 24 Sep. 2019, which is hereby incorporated by reference herein for all purposes.

BACKGROUND

Identifying new technologies that may enhance a business may be difficult due to the volume of information about new technologies for sale and under development. Further, it may be difficult to obtain information about trends in specific technology sectors due to decentralized data and rapid growth and convergence of technology.

It is therefore desirable to provide a system for technology classification and opportunity mapping. Interactive technology opportunity maps aggregate data regarding new available technologies, companies offering new technologies, and technology sectors in a useful format. Accordingly, interactive technology opportunity maps assist users in locating new technology and assessing portions of the technology market.

SUMMARY

The present disclosure provides for a system for evaluating technology offerings of one or more companies. A database includes a plurality of available technologies associated with one or more tags categorizing the available technology. A correlation engine returns one or more available technologies from the database based on a correlation between one or more received technology parameters identifying technology types for evaluation and the one or more tags associated with the one or more available technologies. A landscape engine groups the one or more available technologies based on tags and generates an interactive technology opportunity map for display on the user interface.

A method for generating an interactive technology map identifies one or more technology parameters and returns one or more available technologies based on a correlation between the one or more technology parameters and one or more tags associated with a plurality of available technologies. The one or more returned available technologies are grouped based on associated tags and an interactive technology opportunity map is generated for display on a user interface, where the interactive technology opportunity map displays the grouped one or more returned available technologies.

One or more non-transitory computer readable media are encoded with instructions which, when executed by one or more processors of a technology mapping system, cause the technology mapping system to generate tags for a plurality of available technologies based on characteristics of the technologies and characteristics of entities associates with the plurality of available technologies. The technology mapping system identifies one or more technologies of interest from the plurality of available technologies based at least on a technology parameter associated with a user and generates a technology opportunity map for display to the user by grouping the one or more technologies of interest and defining rendering characteristics for visual representations of the technologies of interest based on a controlling factor associated with the user.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that.

DETAILED DESCRIPTION

In various embodiments a system and method for identifying, categorizing, and outputting technology opportunities in a curated manner is disclosed. The system can identify technological areas that may be of interest to a user based on characteristics of the user or the user's company, and then analyze various third party companies to determine those that may be of interest to the user, e.g., companies that may be rapidly expanding in the technological sector, those that are heavily invested in the sector, or the like. The curation of the system may also generate an output to the user that visually ranks or weights the different results, such as by increasing or varying size of display (e.g., icons), changing an orientation or position on the display screen, or the like. In this manner, the user may able to quickly and visually identify new technologies that may be of interest, as well as third parties that may be of interest, without having to wade through dense written materials or the like.

Figure 1:
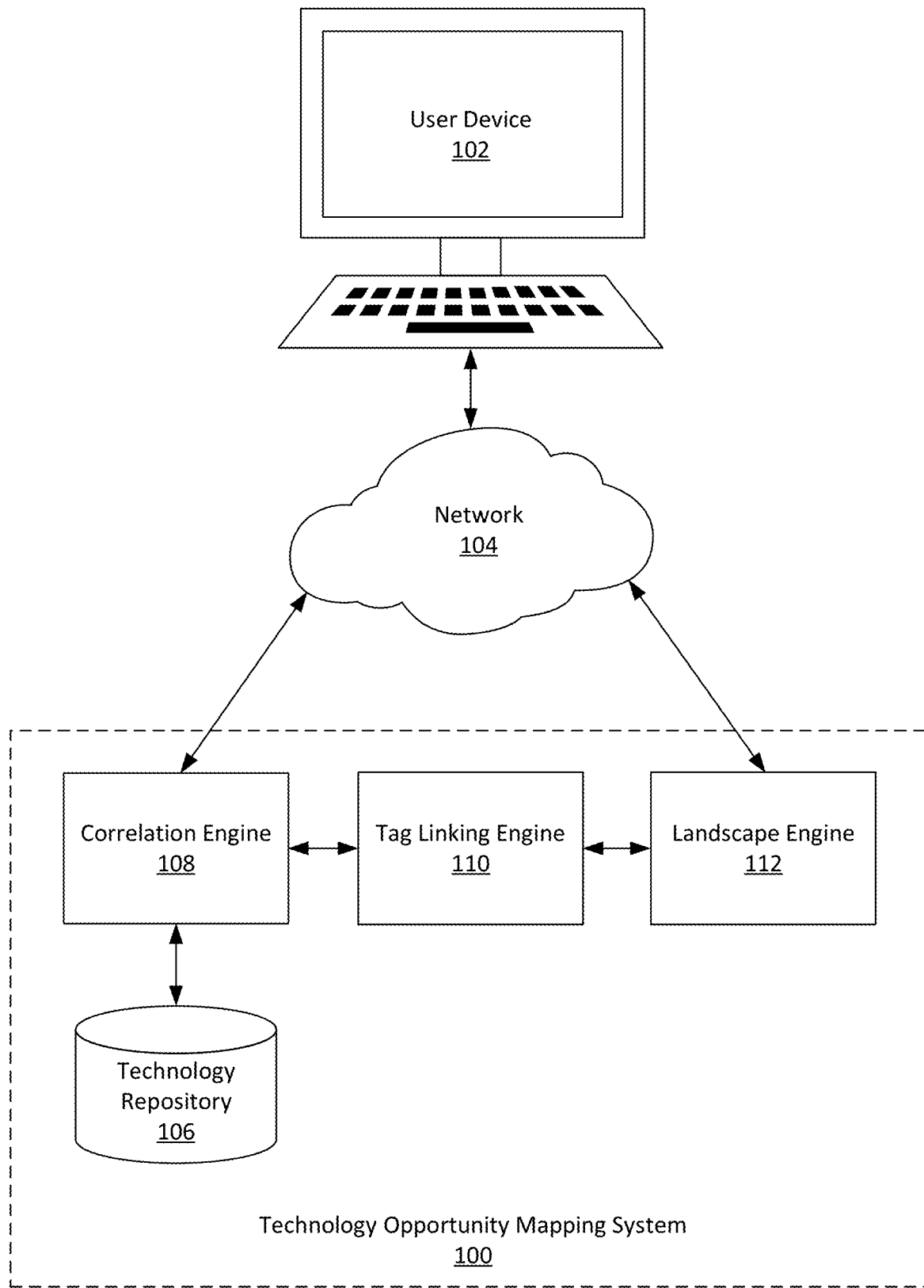
FIG. 1 is a schematic diagram of an example technology opportunity mapping system.

Turning to the figures, FIG. 1 is a schematic diagram of an example technology opportunity mapping system 100. A user device 102 may access the technology opportunity mapping system 100 through a network 104. The technology opportunity mapping system 100 generates interactive technology opportunity maps based on a desired technology or other industry space identified by a user. For example, if the user is a major retailer, the user may want to view technology opportunities related to customer experience in online shopping. The interactive technology opportunity map provides an aggregation of information about technology relating to customer experience in online shopping in a layout that facilitates efficient decision making. For example, instead of reviewing a list of companies with technologies relating to customer experience in online shopping, the user receives an interactive technology opportunity map (such as the interactive technology opportunity map shown in FIG. 2) organizing companies with available technologies in narrower categories and allowing for a quick view of information about the companies and the available technology. In some implementations, categories on the interactive map are sized and displayed according to further metadata, such as investment in companies in the category or revenue relating to technology in the category.

The user device 102 may be substantially any type of electronic device that can receive and transmit data, such as, but not limited to, a personal computer, laptop, smartphone, tablet, server, or the like. Similarly, the technology opportunity mapping system 100 may be implemented by one or more servers or computing devices, which may be substantially any type of device that can receive and process information and may be a collection of one or more virtual processing elements (e.g., cloud computing, virtual machines, and the like) that are in communication with one another. The user device 102 and the technology opportunity mapping system 100 may be in communication with one another via a network 104. The network 104 may be any type of data transmission or communication mechanism or multiple mechanisms such as, but not limited to, WiFi, Bluetooth, Zigbee, wired communications, satellite, other types of radio wave, optical transmission methods, or the like.

The technology opportunity mapping system 100 allows for aggregation of large amounts of data about companies and available technology. For example, information companies with technology available for sale (or alternatively, licensing or investment) is stored in a technology repository 106. The technology repository 106 may receive information about available technologies directly from entities offering the available technology for sale (e.g., through a form collecting information from entities wanting to include technology in the technology repository 106). In some implementations, the information collected directly from an entity may be supplemented by information from other available sources, such as internet databases. For example, the system may gather company information available via the internet and run the information through a natural language processor (NLP) to identify relevant information for inclusion in the technology repository 106. Accordingly, more information about the company or the technology may be included even where the entity may not readily divulge the information. For example, negative or neutral reviews of the technology may be obtained from the internet, offering a more complete picture of the technology and the company offering the technology. For example, reviews for a company or a technology offered by the company may be obtained and an average review value (e.g., star rating or other ratings) may be generated for the technology or the company. In other examples, text of consumer reviews may be parsed by an NLP or language parser to look for key phrases and concepts such as, for example, "reliability," "customer service," etc. Further, in some implementations, information regarding a technology and/or the company associated with the technology may be obtained from sources other than the entity.

In some implementations, technologies may be stored in the technology repository 106 in groups or associations, which may be considered collections. Such collections may be based on characteristics of entities associated with technologies or characteristics of the technologies themselves. For example, entities operating in similar technological spaces, with similar funding, in similar geographic areas, or with other corresponding characteristics may be in a collection. An example manually generated collection may include entities of interest to a user for investment. Technologies may be grouped based on Such collections may be generated by the system for specific users or generally or may be generated manually by a user.

Technology characteristics may be correlated with information about the entity offering the technology in the technology repository 106. Such information may include, for example, paying and non-paying customers of the entity, entity size (e.g., employees), entity revenue, how long an entity has been operating, and the like. In some implementations, similar information about entities may be used to generate performance indexes measuring entity performance. For example, an entity may be associated with a performance index described in U.S. patent application Ser. No. 17/024,495 entitled "Indexing Entities based on Performance Metrics," filed 17 Sep. 2020, which is hereby incorporated by reference herein in its entirety for all purposes. Such indexes may quantify performance of entities using an index value that allows for direct comparison of performance between different types of entities with differing characteristics (e.g., size, length of existence, etc.). Such performance information may be useful to identify technologies associated with high-performing or low-performing entities to assist users in selecting technology. For example, a user may select to only view technology from companies with a performance rating above a certain index value.

In some implementations, the technology opportunity mapping system 100 may generate additional information relating to an available technology or an entity offering available technology. For example, the system may calculate probabilities, such as likelihood of success, anticipated next funding rounds, expected development, expected growth, etc. Such probabilities may be determined based on, for example, a comparison of other similarly situated entities over time and past and future behavior of those entities. For example, the system may aggregate various information about various entities including, without limitation, funding history, revenue history, industry, growth rates (e.g., change in headcount over time). To predict an anticipated value of future funding rounds for an entity, the system may use historical data from funding rounds of similarly situated (e.g., similar size, industry, funding history) entities.

The technology repository 106 may store available technology along with associated tags describing the available technology. For example, technology relating to storing payment methods for loyalty customers may be associated with the tags "frictionless payment" and "loyalty." In some implementations, the associated tags are added by the company offering the available technology when the available technology is first stored in the technology repository 106. Alternatively or in addition, in some implementations users may be prompted to identify additional tags during the generation of the interactive technology opportunity map. In implementations where technologies are stored using collections, a name or other identifier of the collection may be associated with the technology as a tag.

In some implementations, machine learning may be used to associate relevant tags with available technology. For example, a NLP may parse descriptions of available technology to search for tags and identify appropriate tags. For example, a description of a technology may include several possible use cases, which may become tags. The NLP may also identify technological areas, compatibilities with existing systems, comparisons to other technologies and may generate tags based off of those identifications. For example, a description of a technology may present the technology as an alternative to a widely used PaaS system. The NLP may identify the widely used system in the description and suggest "PaaS" as a tag for the relevant technology. Accordingly, where an entity offering the technology does not enter tags or enters few tags, additional relevant tags may be identified based on descriptions of the technology. Other machine learning techniques, such as clustering, may also be used to generate tags based on entered tags or descriptions of the technology. For example, a deep neural network may be used to cluster descriptors with tags. In other examples, classifiers may be used separately or in combination with other models to generate tags based on descriptions of technology or manually entered tags. Through the use of machine learning to generate additional tags, the technology opportunity mapping system 100 may obtain more robust data for classification than manual selection of tags alone.

Tags may also, in some implementations, be generated algorithmically. Such algorithms may be used alone or in conjunction with machine learning models and manual tagging described above. For example, an algorithm may be used to define additional tags that are suggested based on concepts extracted from a technology description by a NLP. In another example, an algorithm may provide for suggestion of a certain subset of tags based on tags selected manually. Such tags, may, in some implementations, broaden the tags input manually. For example, where a tag for "online payment verification" is used, an algorithm may suggest or automatically add a tag for "online retail" because online payment verification is generally within the larger category of online retail. Such broadening may lead to a technology being mapped more often because, for example, users may be more likely to search for technology relating to online retail in general than for technology specifically related to online payment verification.

Through a user interface on the user device 102, the user may enter keywords related to desired technology for use by the technology opportunity mapping system 100. Continuing the previous example of a retailer searching for technology associated with customer experience in online shopping, the user may enter "customer experience online shopping" as the input technology parameters. In some implementations, the user may select Boolean operators for relation between the keywords to form the input technology parameters. The user input may be free form input (analogous to a search engine) or may offer the user the ability to select technology parameters from a predetermined list. In some implementations, the technology opportunity mapping system 100 may suggest additional narrowing keywords to the user to better define the technology parameters. For example, if the user input "customer experience," the technology opportunity mapping system 100 may suggest the addition of "online" or "in-store" to provide more relevant results in the interactive technology opportunity map.

Technology parameters may also be suggested for a user (e.g., an entity or investor) based on characteristics of the user. For example, where the user is an entity, technology parameters may be suggested based on a profile of the entity, such that the entity is presented with types of technology useful or relevant to its business model. For example, where an entity is a restaurant, technology parameters may be suggested for mobile ordering, mobile delivery, point of sale (POS) systems, etc. In some implementations, a user may enter a collection identifier as a technology parameter to generate a technology opportunity map including entities or technologies included in one or more collections of the technology repository. A user or entity profile may be generated based on publicly available information about the entity (e.g., from annual reports to the Securities and Exchange Commission (SEC) for public companies), questions presented to a user upon registering with the technology opportunity mapping system 100, previous contracts, purchases, and/or deals entered into by the entity, among other sources. In some examples, the user profile may be generated using methods described to generate a party profile in U.S. patent application Ser. No. 16/912,433 entitled "Dynamic and Automatic Agreement Generation and Modification," filed 25 Jun. 2020, which is hereby incorporated herein in its entirety for all purposes.

A correlation engine 108 receives the technology parameters. The correlation engine 108 is configured to return one or more available technologies from the technology repository 106 based on a correlation between the one or more received technology parameters and the one or more tags associated with the one or more available technologies. In some implementations, the correlations may be predetermined by the technology opportunity mapping system. For example, keywords may be associated with tags such that when the keywords are used, the associated tags are automatically returned by the correlation engine. In some implementations, the correlation between keywords and tags may be refined through machine learning, such that the tags associated with keywords become more relevant over time. This provides more flexibility in the technology opportunity mapping system to adapt to new technologies as they are introduced to the market.

In one example, a deep neural network may be used to generate and track associations between technology parameters and tags associated with technologies in the technology repository 106, such that technology parameters are used to return tags that are strongly correlation with the technology parameter. In some implementations, the tags and technology parameters may include the same words or phrases and tags including all or some of the words included in a technology parameter may be presumed to be strongly correlated to the technology parameter.

In some implementations, the correlation engine 108 may present the user with the associated tags before returning the available technologies. The user may then select which tags to include and which tags to eliminate based on what types of technology the user is searching for. For example, a retailer searching for "customer experience online shopping" may be presented with tags for technology related to predictive advertising for competitor websites along with tags for technology related to frictionless payment. The user may then choose to not include tags for technology related to predictive advertising for competitor websites in the interactive technology opportunity map. This selection of relevant tags helps create more relevant interactive technology opportunity maps and saves computing resources by narrowing the scope of what is presented in the interactive technology opportunity maps. Further, the selection of tags to include may be used an input for the machine learning process of correlating tags with keywords. For example, the more a specific tag is selected as a result of searching a specific keyword, the stronger the association will be between that tag and keyword.

Once the correlation engine 108 has either selected tags or received a selection of tags from the user, the correlation engine 108 retrieves available technologies associated with those tags from the technology repository 106. The available technologies retrieved from the technology repository 106 may include various metadata including, for example and without limitation, company headcount, capital raised, company revenue, and patents filed. The correlation engine 108 passes the retrieved available technologies to a tag linking engine 110.

The tag linking engine 110 identifies associations between similar tags to group similar tags together. For example, the tag linking engine 110 may receive three available technologies as part of a larger group of available technologies. One available technology may have the tag "rewards program" while the other technologies have the tags "store loyalty rewards" and "loyalty points." The three technologies may be very similar and their associated tags are similar to one another. For example, the concepts are interrelated, where loyalty points are often used in rewards programs or for store loyalty rewards. Further, rewards program and store loyalty rewards may often be used interchangeably when describing the same programs or systems. Accordingly, the layout, readability, and utility of the final interactive technology opportunity map is improved when these technologies are presented under a single tag instead of as three distinct tags.

In some implementations, the tag linking engine 110 may present a list of tags to the user for the user to determine when tags should be linked. In this implementation, once a user has indicated that two tags are linked, the tags remain linked within the technology opportunity mapping system 100. Accordingly, the tag linking engine 110 will automatically link those tags in the future. The tag linking engine 110 may also use other methods for linking tags, such as linking tags with similar words and machine learning.

The tag linking engine 110 may present the user with a list of tags that have been linked and allow the user to remove a link between two or more tags linked by the tag linking engine 110. Where tags are linked partially or wholly using machine learning, unlinking of tags by the user provides feedback for the tag linking engine 110 to become more accurate over time. Once the linked tags are finalized, the tag linking engine 110 passes the retrieved available technologies and the associated tags to a landscape engine 112. In some examples, the tag linking engine 110 may also allow the user to manually link tags or otherwise adjust inputs to the tag linking engine 110.

The landscape engine 112 generates the interactive technology opportunity map of the available technologies based on the associated tags. The landscape engine 112 uses the linked tags generated by the tag linking engine 110 to generate groups of available technologies. Where a tag is not linked to another tag, the tag may become its own group for display.

Figure 2:
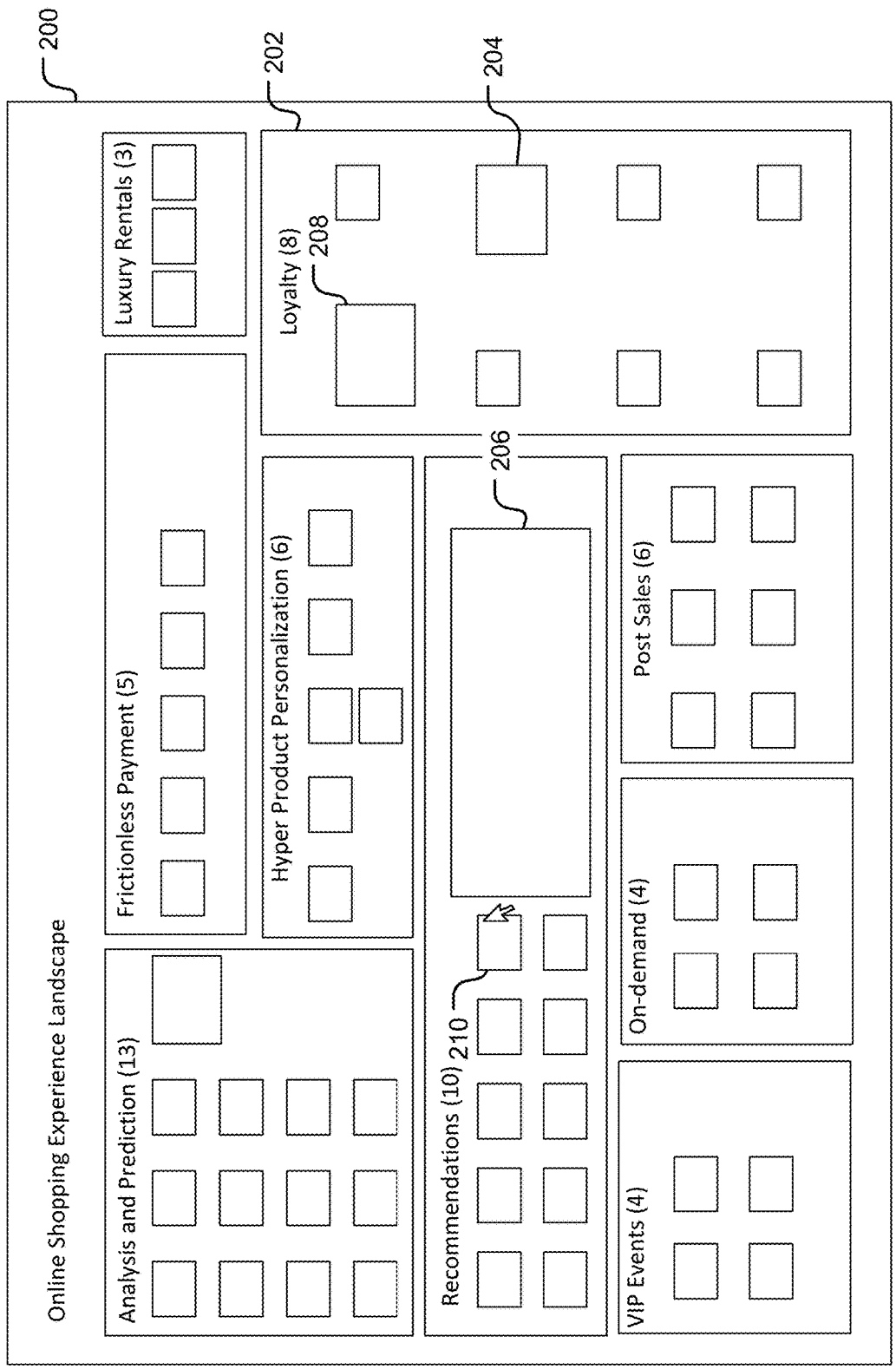
FIG. 2 is an example interactive technology opportunity map.

The landscape engine 112 displays the groups of available technologies using display features that form part of the larger interactive technology opportunity map, as shown in FIG. 2. Output characteristics for display features, such as individual blocks and icons representing individual technologies may be varied based on characteristics of the technologies, entities, or groups of technologies represented by elements of the technology opportunity map. For example, the location and size of the individual blocks may, in some implementations, be determined by characteristics of the individual available technologies within the group displayed in the individual blocks or by aggregate characteristics of the available technologies within the group. For example, in some implementations, the size of the individual blocks may be determined by the average head count of companies offering available technologies in the individual blocks. Other examples of characteristics of individual available technologies may include, without limitation, average capital, average growth, or average revenue in the past year for the companies offering the available technologies within the group. Examples of aggregate characteristics may include, for example and without limitation, aggregate head count, aggregate capital, aggregate growth, aggregate revenue, or number of companies offering the available technologies within the group. In some implementations, the user may choose which characteristics will control the size of the individual blocks within the interactive technology opportunity map. In other implementations, display characteristics may be chosen by the system based on user characteristics, such as risk tolerance, price preference, high priority areas of expansion, or other relevant information that may be obtained from a user profile.

In some implementations, the user may determine which of the characteristics of individual available technologies will control the size of display features within the interactive technology opportunity map. For example, a user that is interested in investment activity around technologies affecting a certain industry may select aggregate capital as the controlling characteristic. The user may directly select a controlling characteristic or the user may indirectly select a controlling characteristic. Indirectly selecting a controlling characteristic may be, for example, selecting a type of interactive technology opportunity map from a list of options, where the types of maps have different controlling characteristics. For example, a "growing industries" interactive technology opportunity map may use aggregate growth as a controlling characteristic. Accordingly, the user is indirectly selecting aggregate growth as the controlling characteristic when selecting to generate a growing industries interactive technology opportunity map.

In other implementations, models implemented within the landscape engine 112 may determine the controlling characteristic. For example, the landscape engine 112 may choose the controlling characteristic based on the user requesting the interactive technology opportunity map. Or, the landscape engine 112 may choose the controlling characteristic that highlights differences between the groups. For example, where all groups have similar aggregate capital but several groups have substantially higher aggregate revenue than the remaining groups, aggregate revenue may be chosen as the controlling characteristic to highlight this difference for the user. Further, in some implementations, the landscape engine 112 may generate several landscapes for the same data, with the different landscapes using different controlling characteristics. In yet another implementation, more than one controlling characteristic may be used in the generation of a single interactive technology opportunity map.

In some implementations, the landscape engine 112 may similarly select the location of individual blocks within the interactive technology opportunity map based on characteristics of the companies within the group displayed in the individual blocks. The formatting performed by the landscape engine 112 increases the utility of the interactive technology opportunity map by drawing the user's attention to groups of technology with characteristics important to the user using larger individual blocks or individual blocks placed in a more prominent location within the interactive technology opportunity map.

Once the landscape engine 112 has generated the interactive technology opportunity map, the interactive technology opportunity map is displayed on the user device 102. When displayed on the user device 102, the interactive technology opportunity map may include interactive features. For example, the user may be able to hover over a particular company within the interactive technology opportunity map and view statistics about the company and the available technology. In some implementations, the user may create an interactive technology opportunity map that updates as new available technologies are added to the technology repository 106. This may be accomplished by, for example, repeating the process of generating the interactive technology opportunity map at a specified time interval. For example, the interactive technology opportunity map could be updated quarterly. Alternatively, the interactive technology opportunity map could be set up to update whenever an available technology associated with one of the tags forming a group in the interactive technology opportunity map is added to the technology repository 106. This updating allows users to visualize changes in areas of technology over time. In some implementations, the updating may also update copies of the interactive technology opportunity map displayed in other locations, such as company websites. In various examples, the technology opportunity map may be updated continuously or at set times, resulting in a dynamic map updating as new information is received.

The technology opportunity map may, in some implementations, update each time the map is loaded, either by the user or another. Updates to the map may reflect changes made directly by the user, changes made to the user's user profile, or changes made to technologies in the technology repository 106. Changes made to the technologies may include, for example, updated earnings for an entity associated with the technology, an updated description of the technology, and the like. Changes made to the user profile may include adding entities or technologies to a collection, changing areas of interest or areas of operation, and the like. Such changes may be propagated down through the technology opportunity map to update groups displayed, rendering of visual elements, placement of visual elements, and/or technologies displayed, among other characteristics.

In some implementations, the user may share the technology opportunity map and may collaborate with other users, either in the same or another entity, to update the shared map. For example, updates may apply a specific theme or filter to a technology opportunity map, which may change the information displayed on the map. For example, themes may include competitor monitoring, research and development, investment opportunities, fast growing entities, and the like. Users may save filtered maps as new maps in some implementations.

FIG. 2 is an example interactive technology opportunity map 200. The interactive technology opportunity map 200 displays icons or other display elements representative of groups of companies offering available technology. The groups are displayed as icons (e.g., icon 204) in individual blocks (i.e., individual block 202) within the interactive technology opportunity map 200. The icons may be, for example, logos of the companies offering available technologies in the interactive technology opportunity map 200. The interactive technology opportunity map 200 is generated by a technology opportunity mapping system, as described above with respect to FIG. 1.

The individual blocks in the interactive technology opportunity map 200 are sized based on characteristics of the individual available technologies within the group displayed in the individual blocks or by aggregate characteristics of the available technologies within the group. For example, in some implementations, the size of the individual blocks may be determined by the average head count of companies offering available technologies in the individual blocks. Other examples of characteristics of individual available technologies may include, without limitation, average capital, average growth, performance index, average revenue in the past year for the companies offering the available technologies within the group, or various other performance metrics. Examples of aggregate characteristics may include, for example and without limitation, aggregate head count, aggregate capital, aggregate growth, aggregate revenue, aggregate performance index, or number of companies offering the available technologies within the group. In some implementations, the user may choose which characteristics will control the size of the individual blocks within the interactive technology opportunity map.

In the interactive technology opportunity map 200, the individual block 202 is sized proportionally larger than other individual blocks within the interactive technology opportunity map 200 proportionally to the number of companies (represented by icons) displayed within the individual block 202. If, for example, aggregate investment was selected by the user as a controlling characteristic determining size of the individual blocks during the generation of the interactive technology opportunity map 200, the size of the individual block 202 indicates that technology relating to loyalty has a large amount of aggregate investment. Various display elements within the technology opportunity map 200 may be displayed proportionally to a variety of metrics such as a ranking of an entity or technology within a group, revenue generated by a technology, investment in an entity, predicted relevance to the user, and the like.

Further, as shown in the interactive technology opportunity map 200, the icons may be sized differently to reflect differences in the controlling characteristic between companies offering available technologies within the same group. For example, in the individual block 202, icons 204 and 208 are larger than the remaining icons, with the icon 208 being slightly larger than the icon 204. If, for example, aggregate capital was selected as the controlling characteristic, this size difference (or other variations in display) may indicate that the company represented by the icon 208 received the most capital and the company represented by the icon 204 received less capital than the company represented by the icon 208 but more capital than the remaining icons in the individual block 202.

The interactive technology opportunity map 200 may also include interactive company information. For example, the banner 206 may display information about the company represented by icon 210. In one implementation, the banner 206 appears when the user hovers over the icon 210. In other implementations, the banner 206 may appear when the user clicks on the icon 210. In some implementations, interactive company information may be presented in other formats, such as pop-ups, audio information, or a split window. Further, in some implementations, the interactive technology opportunity map 200 may allow users to compare interactive company information for two or more companies within the interactive technology opportunity map 200.

Figure 3:
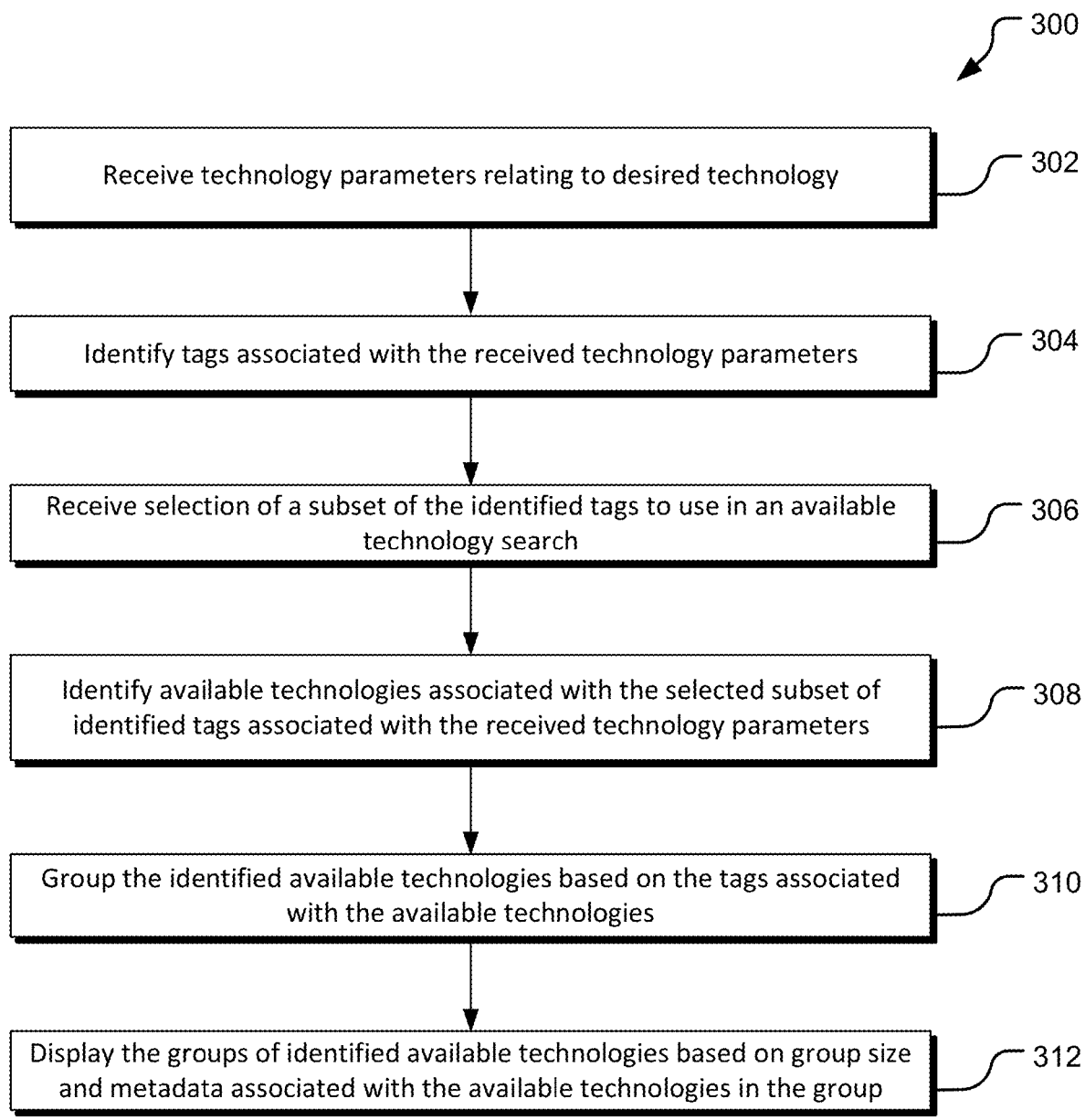
FIG. 3 is a flow diagram of steps for generating an interactive technology opportunity map.

FIG. 3 is a flow diagram of steps for generating an interactive technology opportunity map. A first receiving operation 302 receives technology parameters relating to desired technology. Technology parameters may be, for example, keywords related to the type of technology or industry the user wants to include in the interactive technology opportunity map. In some implementations, the technology parameters may be entered by the user as text. In other implementations, the user may select relevant technology parameters from a list.

In some implementations, technology parameters may be obtained based on a previously created collection or list of entities. For example, a user may add entities to a list of entities of interest to the user for future partnerships, utilization of technology produced by the entities, investment, and the like. A user may select an option to generate a technology opportunity map based on the list of entities created by the user. The entities in the list may be associated with tags or other metadata including types of technology or features of technology offered by the entities. Such tags may be used to generate technology parameters for generation of the technology opportunity map and may identify other entities offering similar technologies.

Technology parameters may also be suggested to a user based on the user's own characteristics or characteristics corresponding to an entity associated with the user (e.g., corporation employing the user). For example, technology parameters may be suggested based on an industry of the user as retrieved from a user profile or other sources of information about the user (e.g., public databases). In some implementations, technology parameters may be further narrowed based on previous activity of the user within the system or related systems, as captured, for example, in a user profile. In one example, users that are retail entities may be presented with a pre-defined list of suggested technology parameters for a variety of technologies relating to, for example, inventory, customer experience, commerce websites, shipping logistics, in store-technology, etc.

In an example where a user profile of a retail entity shows that the retail entity has contracted for a specific technology for shipping logistics, the user may not be presented with suggested technology parameters related to shipping logistics, because the user is not likely to be searching for that type of technology. Accordingly, users may be presented with suggested technology parameters for technology they are more likely to be interested in and/or technology the user is actively researching. A user may, in various implementations, be an entity as a whole or a specific person (or role) within an entity. Accordingly, suggested technology parameters may vary based on role when the user is a person. In other examples, users may be presented with suggested technology parameters based on recent searches and/or landscapes generated by similarly situated entities. For example, where a user is a retail entity with physical stores and many other retail entities with physical stores have searched for technology for curbside pickup logistics, the user may be presented with a suggested technology parameter for curbside pickup logistics. Accordingly, users may be presented with technology that is likely relevant to their respective industry.

A first identifying operation 304 identifies tags associated with the received technology parameters. In some implementations, correlations between tags and technology parameters may be predetermined by the technology opportunity mapping system. For example, keywords may be associated with tags such that when the keywords are used, the associated tags are automatically identified in the first identifying operation 304. In some implementations, the correlation between keywords and tags may be refined through machine learning, such that the tags associated with keywords become more relevant over time. For example, clustering techniques using deep neural networks, classifiers, or other machine learning models may generate associations between technology parameters and associated tags as the system generates tags. Tags may then be returned when they are highly correlated to a technology This provides more flexibility in the technology opportunity mapping system to adapt to new technologies as they are introduced to the market.

A second receiving operation 306 receives a selection of a subset of the identified tags to use in an available technology search. In some implementations, the selection of the subset of identified tags is received in response to presenting the associated tags to the user. The user may then select tags to include and tags to eliminate based on types of technology the user would like to include in the interactive technology opportunity map. In some implementations, the associated tags may be presented to the user in order of estimated relevance.

A second identifying operation 308 identifies available technologies associated with the selected subset of identified tags. The available technologies are retrieved from a technology repository and are tagged with at least one of the tags from the selected subset of identified tags. In some implementations, available technologies tagged with the identified tags are retrieved from the technology repository. In other implementations, available technologies may first be evaluated by tags and then evaluated by a second criteria, where only technologies meeting the second criteria are identified by the second identifying operation 308. For example, a user may specify that it is interested in available technologies in mobile food ordering that are past beta testing stage. The identifying operation 308 would then identify available technologies tagged with mobile food ordering and return a subset of the available technologies tagged with mobile food ordering and that have satisfied the requirement of already conducted beta testing, which may be stored as a separate tag and/or metadata. In this manner, a user may be able to focus on available technologies that are of the most interest given the user's situation. Other examples of second criteria may include scalability, cost, performance indicators for entities associated with available technologies, technologies already in use in a particular sector, and the like.

A grouping operation 310 groups the identified available technologies based on the tags associated with the available technologies. In some implementations, the grouping operation 310 groups the identified available technologies by grouping together available technologies. In other implementations, the grouping operation 310 may also identify similar tags and group available technologies with similar tags together. Similar tags may be identified using a variety of methods, including, without limitation, user identification and machine learning.

In some implementations, the grouping operation 310 may occur when a certain number of tags (e.g., above a threshold level) are included in the identified technologies. For example, where a user searches for a narrow technology area and the returned technologies are associated with three tags, the grouping operation 310 may generate three "groups," each covering one of the three tags, rather than attempting to group the tags together. In other implementations, the user may be presented with a list of tags included in the results and given the option to group tags together for the purposes of the technology opportunity map. For example, the user may be presented with options to combine groups for simplification of the technology opportunity map. Alternatively or additionally, tags may be grouped using clustering, deep neural networks, or stored associations (e.g., correlation values) between tags.

In some implementations, the grouping operation 310 may utilize lists or collections of entities previously created by the user or an entity associated with the user. For example, a user may store, in a user profile or other similar location, lists of entities of interest to the user, which may be categorized based on specific needs of the user. For example, a nationwide retailer may keep lists of collections of entities separated by geographic regions served by the retailer. Large enterprises with multiple divisions may keep lists of collections of entities separated by divisions of the enterprise. The grouping operation 310 may generate groups for each of the lists or collections and may then analyze the identified technologies to place the technologies in one of the generated groups. Accordingly, users may visualize technologies using groupings that are particularly relevant to the specific situation of the user.

A displaying operation 312 displays the groups of associated available technologies based on group size and metadata associated with the available technologies in the group. The associated technologies can be represented by icons, which may be placed in individual blocks or segments according to groups. The location and size of the individual blocks may, in some implementations, be determined by characteristics of the individual available technologies within the group displayed in the individual blocks or by aggregate characteristics of the available technologies within the group. For example, in some implementations, the size of the individual blocks may be determined by the average head count of companies offering available technologies in the individual blocks. Display size may, in some implementations, be proportional to respective characteristics. Other examples of characteristics of individual available technologies may include, without limitation, average capital, average growth, or average revenue in the past year for the companies offering the available technologies within the group. Examples of aggregate characteristics may include, for example and without limitation, aggregate head count, aggregate capital, aggregate growth, aggregate revenue, or number of companies offering the available technologies within the group. In some implementations, the user may choose which characteristics will control the size of the individual blocks within the interactive technology opportunity map.

Further, the location of individual blocks within the technology opportunity map may be selected based on characteristics of the associated technologies in the group represented by the block. For example, individual blocks that are a higher priority (e.g., include technology the user is researching, include technology likely to increase in price in the near future, or include technologies associated with higher performing entities, etc.) may be placed in a location that draws the user's attention (e.g., the middle of the technology opportunity map). Such placement and relative priorities may be determined by the user or by the system.

The location and size of icons within individual blocks may be varied in a similar manner as the individual blocks. For example, technologies associated with higher performing entities may be sized larger relative to other icons within the individual block or may be placed in a more prominent location. Various criteria may be used to determine the size and placement of the icons and such criteria may be chosen by the system (e.g., based on predictions about the desirability of technologies to the user) or may be chosen by the user. For example, the system may look at previous transactions entered into by a user and determine that the user has a preference for technology that is in the beta testing stage. Accordingly, the system may size icons associated with technologies in beta testing larger than icons associated with technologies available for general release, such that the user's attention is drawn to technologies more likely to be of interest. In another example, the user may set cost criteria such that technologies offered at a lower cost (or likely to be offered at a lower cost, based on the entities associated with the technologies) are prioritized and are thus placed in more prominent locations within the individual blocks.

In some implementations, users may revise the generated technology opportunity map or may collaborate with other users to revise or create additional versions of the technology opportunity map. For example, where a user has selected a controlling characteristic during generation of the technology opportunity map, the user may change the controlling characteristic to revise the map and view the technologies differently. For example, icons representing technologies in a generated map may be sized proportionally to revenue of the entities offering the technologies. In revising the map, the same technologies may be viewed with icons sized proportionally to growth rate of the entities offering the technologies. Other changes, such as adding or subtracting groupings or blocks of technologies displayed on the map may change the technologies displayed on the map. For example, a user may remove several groups from a map to focus on the remaining groups and better visualize relationships between the remaining groups.

Figure 4:
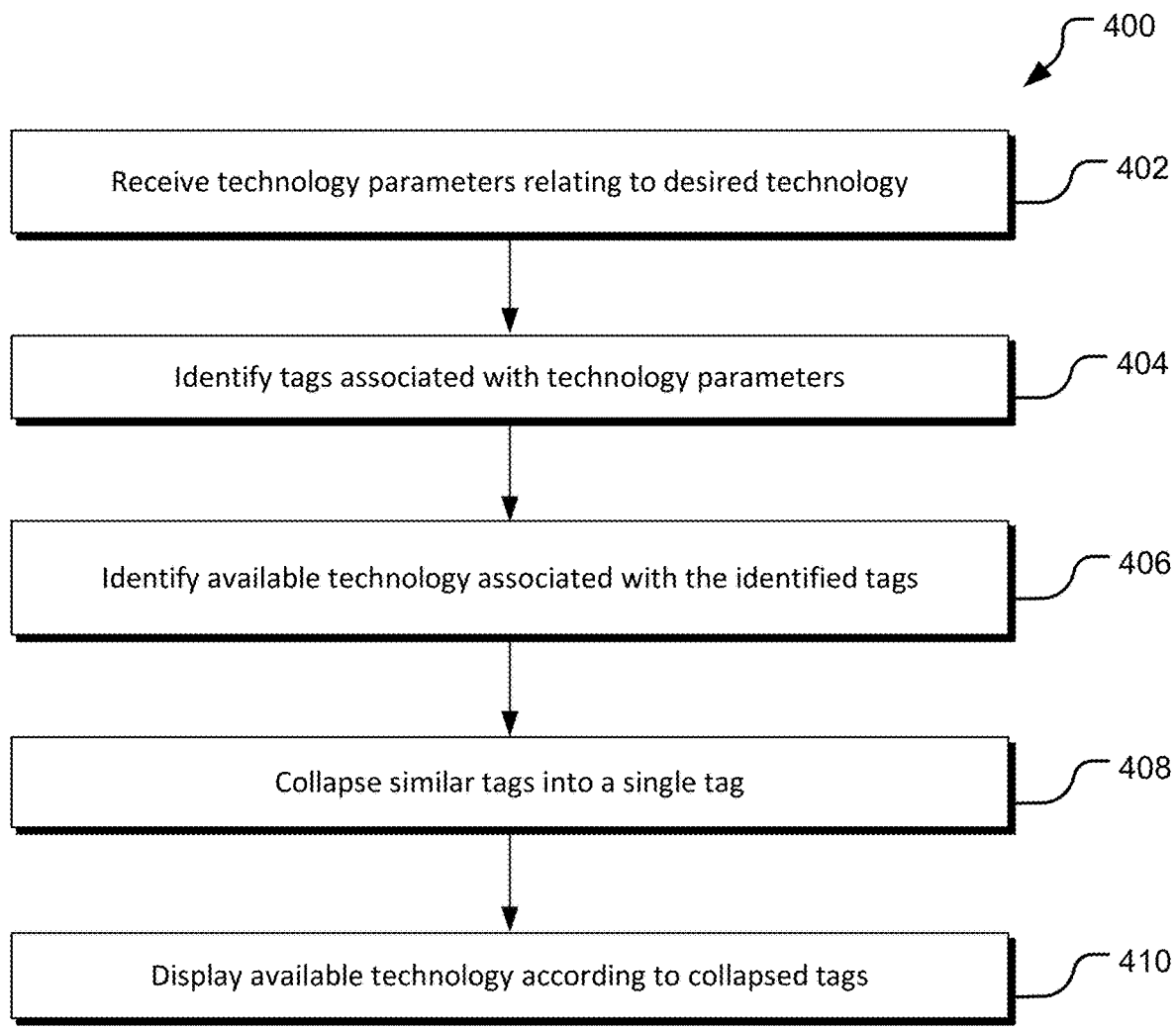
FIG. 4 is a flow diagram of steps for identifying categories of tags for use in the generation of interactive technology opportunity maps based on received technology parameters.

FIG. 4 is a flow diagram for creating categories of tags used in the generation of interactive technology opportunity maps based on received technology parameters. A receiving operation 402 receives technology parameters relating to the desired technology. Technology parameters may be, for example, keywords related to the type of technology or industry the user wants to include in the interactive technology opportunity map. In some implementations, the technology parameters may be entered by the user as text. In other implementations, the user may select relevant technology parameters from a list. In some implementations, the list from which the user selects relevant technology parameters may be curated or personalized for the user. For example, lists may be generated based on the industry of the user, such that the user is not presented with a very large list including technologies that are not likely to be relevant to the user. For example, some technologies may not be presented to users in certain industries or with certain characteristics. For example, a fully online retailer may not be presented with options for curb-side pickup or in-store experiences.

A first identifying operation 404 identifies tags associated with the technology parameters. In some implementations, correlations between tags and technology parameters may be predetermined by the technology opportunity mapping system. For example, keywords may be associated with tags such that when the keywords are used, the associated tags are automatically identified in the first identifying operation 404. In some implementations, the correlation between keywords and tags may be refined through machine learning, such that the tags associated with keywords become more relevant over time. This provides more flexibility in the technology opportunity mapping system to adapt to new technologies as they are introduced to the market.

A second identifying operation 406 identifies available technology associated with the identified tags. The second identifying operation 406 may further narrow or otherwise filter the results based on additional criteria or characteristics, such as stage of development, cost, lead time until availability, legal risks associated with the entity providing the technology, and the like. The available technologies are retrieved from a technology repository and are tagged with at least one of the tags from the selected subset of identified tags. A listing of technologies in the technology repository may be added to the repository at the request of an entity offering the technology (e.g., by filling in a form for inclusion). Available technologies may also be identified and included in the technology repository using other sources of information, such as paid or free internet databases, news sources, and other sources of information.

A collapsing operation 408 collapses similar tags into a single tag. To collapse similar tags into a single tag, similar tags are first linked together. In some implementations, tags may be linked by providing a list of tags to the user for identification of similar tags. In other implementations, tags may be linked using machine learning or artificial intelligence. For example, a deep neural network may be generated to identify tags that are strongly associated or linked. Tags that are linked may then be collapsed into a single tag. In some implementations, the links are first presented to the user for approval before the tags are collapsed.

A displaying operation 410 displays available technology according to collapsed tags. The available technologies are displayed as part of an interactive technology opportunity map. The available technologies are represented by icons that are displayed in groups in individual blocks within the interactive technology opportunity map. The individual blocks correlate to groups of available technologies. The location and size of the individual blocks within the interactive technology opportunity map may be determined by characteristics of the individual available technologies within the group displayed in the individual blocks or by aggregate characteristics of the available technologies within the group. Further, the location and size of icons representing the individual technologies within the individual blocks may be determined based on characteristics of the technologies or entities associated with the technologies.

Figure 5:
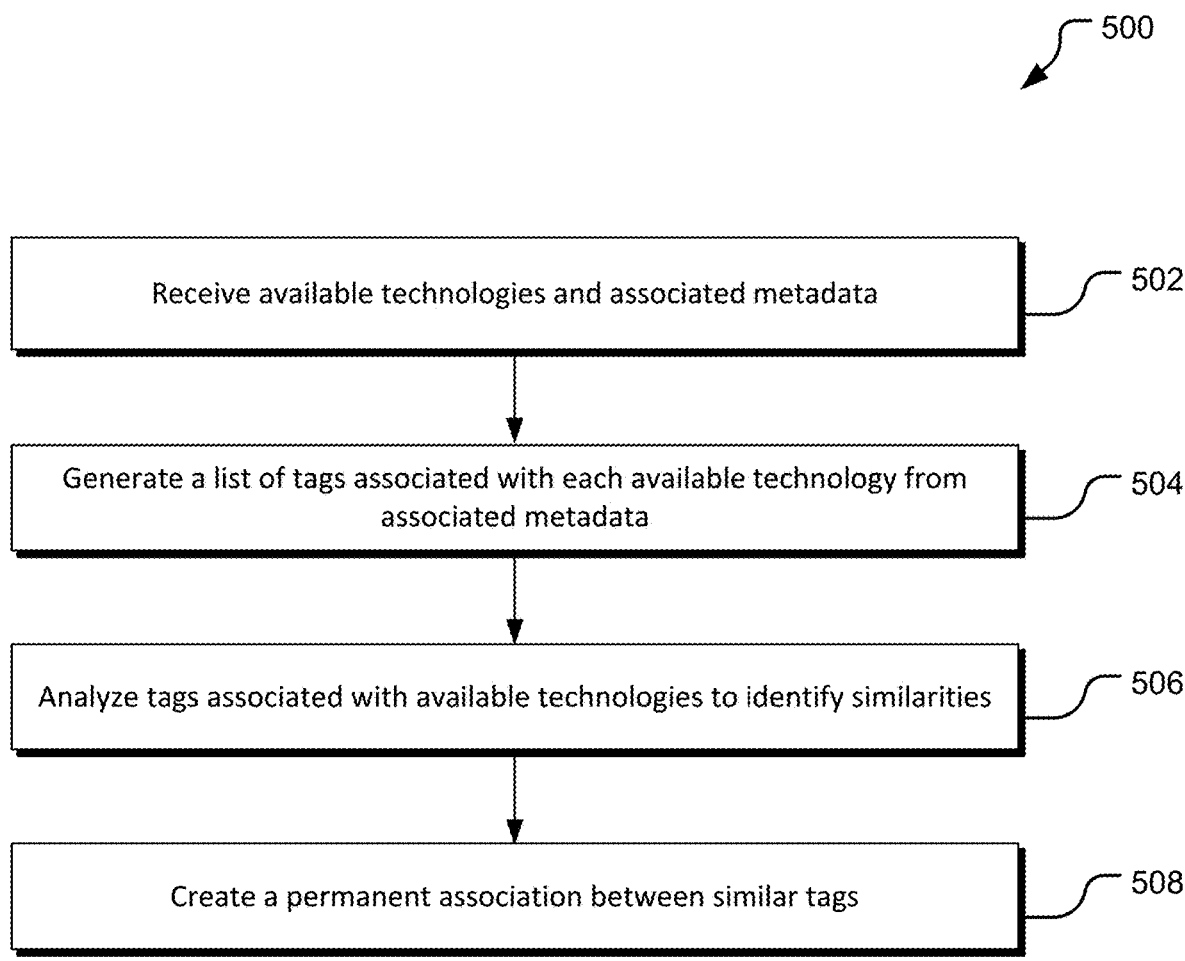
FIG. 5 is a flow diagram of steps for creating associations between similar tags used in the generation of interactive technology opportunity maps.

FIG. 5 is a flow diagram of steps for creating associations between similar tags used in the generation of interactive technology opportunity maps. The process shown in FIG. 5 may occur, for example, when new available technologies are added to a technology repository. A receiving operation 502 receives available technologies and associated metadata. The associated metadata may include, for example, characteristics of the company offering the available technology or characteristics of the available technology, such as industry, applications of the available technology, or broader technological categories (such as internet of things or machine learning). In some implementations, the associated metadata may be added to the available technology by the company offering the available technology or another user who adds the available technology to the technology repository.

A generating operation 504 generates a list of tags associated with each available technology from the associated metadata. The tags associated with the available technology may be, for example, phrases from the associated metadata or phrases relating to phrases from the associated metadata. In some implementations, tags may be generated using machine learning, such as through use of a NLP, classifier, deep neural networks, or combinations of any of the above or other types of machine learning models. When tags are generated using machine learning, the list of tags associated with available technology may be presented to the company offering the available technology for approval. Accordingly, over time, the tags generated for various technologies become more likely to be related to the available technology.

An analyzing operation 506 analyzes tags associated with the available technologies for similarities. In some implementations, the analyzing operation 508 may present a list of tags to a user to determine which tags should be linked due to similarities. In this implementation, once the user has indicate that two tags are linked, the tags remain linked within the technology opportunity mapping system. The analyzing operation 508 may also identify similar words to link together and may use machine learning in conjunction with user input to refine the process of analyzing tags associated with available technologies.

A creating operation 508 creates a permanent association between similar tags. The permanent association may take the form of a link between two or more similar tags, such that the tags are presented as one tag in generated interactive technology opportunity maps. Linked tags may also be used in other areas of the technology opportunity mapping system. For example, when identifying tags associated with received technology parameters, linked tags can be used to locate additional relevant available technology.

Figure 6:
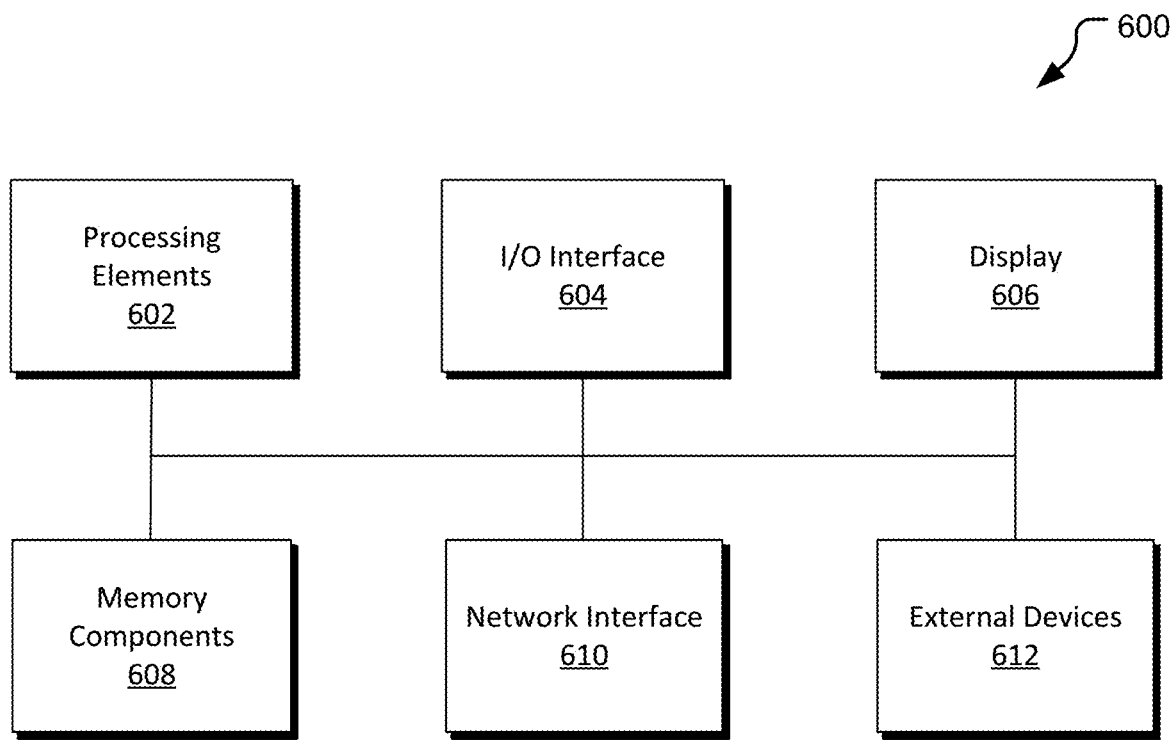
FIG. 6 is a schematic diagram of an example computer system for implementing various embodiments in the examples described herein.

FIG. 6 is a schematic diagram of an example computer system for implementing various embodiments in the examples described herein. A computer system 600 may be used to implement the user device 102 (in FIG. 1) or integrated into one or more components of the technology opportunity mapping system 100. For example, the correlation engine 108, the tag linking engine 110, and the landscape engine 112 may include one or more of the components of the computer system 600 shown in FIG. 6. The computer system 600 is used to implement or execute one or more of the components or operations disclosed in FIGS. 1-5. In FIG. 6, the computer system 600 may include one or more processing elements 602, an input/output interface 604, a display 606, one or more memory components 608, a network interface 610, and one or more external devices 612. Each of the various components may be in communication with one another through one or more buses, communication networks, such as wired or wireless networks.

The processing element 602 may be any type of electronic device capable of processing, receiving, and/or transmitting instructions. For example, the processing element 602 may be a central processing unit, graphical processing unit, microprocessor, processor, or microcontroller. Additionally, it should be noted that some components of the computer 600 may be controlled by a first processor and other components may be controlled by a second processor, where the first and second processors may or may not be in communication with each other.

The memory components 608 are used by the computer 600 to store instructions for the processing element 602, as well as store data, such as the technology repository (e.g., 106 in FIG. 1), and the like. The memory components 608 may be, for example, magneto-optical storage, read-only memory, random access memory, erasable programmable memory, flash memory, or a combination of one or more types of memory components.

The display 606 provides visual feedback to a user, such as a display of the user device 102 (FIG. 1). Optionally, the display 606 may act as an input element to enable a user to control, manipulate, and calibrate various components of the technology opportunity mapping system 100 (FIG. 1) as described in the present disclosure. The display 606 may be a liquid crystal display, plasma display, organic light-emitting diode display, and/or other suitable display. In embodiments where the display 606 is used as an input, the display may include one or more touch or input sensors, such as capacitive touch sensors, a resistive grid, or the like.

The I/O interface 604 allows a user to enter data into the computer 600, as well as provides an input/output for the computer 600 to communicate with other devices or services (e.g., user device 102, correlation engine 108, tag linking engine 110, landscape engine 112 and/or other components in FIG. 1). The I/O interface 604 can include one or more input buttons, touch pads, and so on.

The network interface 610 provides communication to and from the computer 600 to other devices. For example, the network interface 610 allows the technology opportunity mapping system 100 (FIG. 1) to communicate with the user device 106 (FIG. 1) through a communication network. The network interface 610 includes one or more communication protocols, such as, but not limited to WiFi, Ethernet, Bluetooth, and so on. The network interface 610 may also include one or more hardwired components, such as a Universal Serial Bus (USB) cable, or the like. The configuration of the network interface 610 depends on the types of communication desired and may be modified to communicate via WiFi, Bluetooth, and so on.

The external devices 612 are one or more devices that can be used to provide various inputs to the computing device 600, e.g., mouse, microphone, keyboard, trackpad, or the like. The external devices 612 may be local or remote and may vary as desired. In some examples, the external devices 612 may also include one or more additional sensors.

The foregoing description has a broad application. For example, while examples disclosed herein may focus on central communication system, it should be appreciated that the concepts disclosed herein may equally apply to other systems, such as a distributed, central or decentralized system, or a cloud system. For example, the correlation engine 108, the tag linking engine 110, the landscape engine 112, and/or other components in the technology opportunity mapping system 100 (FIG. 1) may reside on a server in a client/server system, on a user mobile device, or on any device on the network and operate in a decentralized manner. One or more components of the technology opportunity mapping system 100 (FIG. 1) may also reside in a controller virtual machine (VM) or a hypervisor in a VM computing environment. Accordingly, the disclosure is meant only to provide examples of various systems and methods and is not intended to suggest that the scope of the disclosure, including the claims, is limited to these examples.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A system for evaluating technology offerings of one or more companies, the system comprising:
   one or more processors; and
   one or more memories configured to store:
      a database storing information on a plurality of technologies;
      a machine learning model comprising at least one of:
         a natural language processor (NLP) configured to receive descriptions of the plurality of technologies and determine the one or more tags categorizing the technology based on the received descriptions,
         a neural network configured to receive the descriptions of the plurality of technologies and perform clustering using the one or more tags and a set of descriptors in the received descriptions, or
         a machine learning classifier configured to generate associations between identified technology parameters and the one or more tags; and
      processor-executable instructions, that when executed by the one or more processors, cause operations to be performed, the operations comprising:
         generating, using the machine learning model, one or more tags that categorize each technology in the plurality of technologies;
         storing the one or more tags in the database;
         analyzing one or more received technology parameters and the one or more tags stored in the database to identify available technologies in the plurality of technologies, the available technologies identified based on correlations between the one or more technology parameters and the one or more tags;
         grouping the available technologies based on the one or more tags to form one or more groups of available technologies;
         receiving, over a network from a computing device, a user input of one or more characteristics to weight the one or more groups of available technologies;
         generating a user interface comprising an interactive technology opportunity map that includes individual blocks, each block representing a group of available technologies, the generating of the user interface comprising:

presenting the individual blocks within the interactive technology opportunity map in different sizes based on the user input of the one or more characteristics, wherein at least one individual block differs in size from other individual blocks;

presenting each individual block at a location within the interactive technology opportunity map based on the user input of the one or more characteristics; and transmitting, over the network to the computing device, the user interface for display.

2. The system of claim 1, wherein:

the one or more memories store further processor-executable instructions for identifying similar tags and creating an association between the similar tags; and grouping the one or more technologies based on the association between the similar tags.

3. The system of claim 2, wherein the machine learning model is configured to:

receive, via the tag linking engine, a user input unlinking at least two tags of the similar tags; and modify the machine learning model based on the received user input unlinking the at least two tags of the similar tags.

4. The system of claim 1, wherein the user input of the one or more characteristics are based on a type of interactive technology opportunity map that is selected by a user.

5. The system of claim 1, wherein the interactive technology opportunity map is formatted to selectively display information about one or more companies offering the available technologies.

6. The system of claim 1, wherein:

the user interface is a first user interface; and the one or more memories store further processor-executable instructions for:

identifying one or more candidate tags based on the one or more received technology parameters;

generating a second user interface to present the one or more candidate tags on the user interface and to receive a selection of one or more of the candidate tags; and transmitting, over the network to the computing device, the second user interface for display.

7. The system of claim 6, wherein the one or more memories store further processor-executable instructions for:

receiving, over the network from the computing device, the selection of the one or more of the candidate tags; and returning available technologies associated with the selected one or more of the candidate tags.

8. The system of claim 1, wherein the machine learning model is configured to:

apply the NLP to a plurality of consumer reviews to extract key words or phrases, wherein the one or more tags are based on the extracted key words or phrases.

9. The system of claim 1, wherein;

the one or more memories store further processor-executable instructions for automatically determining a controlling characteristic to emphasize differences between the one or more groups of available technologies; and the individual blocks are further sized and located within the interactive technology map based on the determined controlling characteristic.

10. The system of claim 1, wherein the one or more memories store further processor-executable instructions for generating a suggested parameter for inclusion in the one or more technology parameters based on a characteristic of a user or an entity associated with the user.

11. A method for generating an interactive technology opportunity map, the method comprising:

associating, by a machine learning model, a plurality of technologies with one or more tags, wherein the machine learning model comprises at least one of:

a natural language processor (NLP) configured to receive descriptions of the plurality of technologies and determine the one or more tags based on the received descriptions, a neural network configured to receive the descriptions of the plurality of technologies and perform clustering using the one or more tags and a set of descriptors in the received descriptions, or a machine learning classifier configured to generate associations between identified technology parameters and the one or more tags;

receiving one or more technology parameters;

returning one or more technologies of the plurality of technologies based on a correlation between the one or more technology parameters and the one or more tags associated with the plurality of technologies;

grouping the one or more returned technologies to form one or more groups of technologies;

receiving, from a computing device, a first user input of one or more characteristics to weight the one or more groups of technologies;

generating a first user interface comprising an interactive technology opportunity map to display the one or more groups of technologies, the first user interface configured to receive one or more user inputs and generating the interactive technology opportunity map comprises scaling visually the one or more groups of technologies based on the first user input of one or more characteristics;

transmitting, to the computing device, the first user interface for display;

receiving, from the computing device, a second user input to modify at least one of the one or more groups of technologies;

generating a second user interface comprising an updated interactive technology map based on the second user input; and transmitting, to the computing device, the second user interface for display.

12. The method of claim 11, wherein the one or more characteristics comprise one or more characteristics of entities associated with the plurality of technologies.

13. The method of claim 12, wherein the one or more characteristics of entities associated with the plurality of technologies include a performance metric for the entities associated with the plurality of technologies.

14. The method of claim 11, wherein the one or more returned technologies are grouped based on characteristics of entities associated with the plurality of technologies.

15. The method of claim 11, wherein the first user input of one or more characteristics comprises is a performance indicator of entities associated with the one or more returned technologies.

16. A system, comprising:
one or more processors; and
one or more memories configured to store:
- a database storing information on a plurality of technologies;
- a machine learning model; and
- processor-executable instructions, that when executed by the one or more processors, cause operations to be performed, the operations comprising:
  - receiving, over a network from a computing device, a first user input of one or more tags and a second user input of one or more technology parameters;
  - analyzing, using the machine learning model, the one or more technology parameters and the one or more tags to identify available technologies in the plurality of available technologies, the available technologies identified based on correlations between the one or more technology parameters and the one or more tags;
  - grouping the available technologies based on the one or more tags to form one or more groups of available technologies;
  - receiving, over a network from a computing device, a second user input of one or more characteristics to weight the one or more groups of available technologies;
  - generating a user interface comprising an interactive technology opportunity map that includes individual blocks, each block representing a group of the available technologies, the generating of the user interface comprising:
    - presenting the individual blocks within the interactive technology opportunity map in different sizes based on the second user input of the one or more characteristics, wherein at least one individual block differs in size from other individual blocks;
    - presenting icons within each individual block in different sizes within the interactive technology opportunity map based on the second user input of the one or more characteristics, wherein a size of at least one icon in at least one individual block differs from a size of another icon in the at least one individual block; and
  - transmitting, over the network to the computing device, the user interface for display.

17. The system of claim 16, wherein:
the user interface is a first user interface; and
the one or more memories store further processor-executable instructions for:
- receiving, from the computing device, a third user input to modify at least one of the one or more groups of technologies;
- generating a second user interface comprising an updated interactive technology map based on the third user input; and
- transmitting, to the computing device, the second user interface for display.

18. The system of claim 16, wherein the one or more memories store further processor-executable instructions for presenting each individual block at a location within the interactive technology opportunity map based on the second user input of the one or more characteristics.

19. The system of claim 16, wherein the second user input of the one or more characteristics comprises one or more keywords related to a type of technology to include in the interactive technology opportunity map.

20. The system of claim 16, wherein the second user input of the one or more characteristics comprises one or more characteristics of available technologies within a group of available technologies.

* * * * *